No. 791,604. PATENTED JUNE 6, 1905.
R. BLAIR.
WOODWORKING MACHINE.
APPLICATION FILED OCT. 3, 1903.
4 SHEETS—SHEET 3.
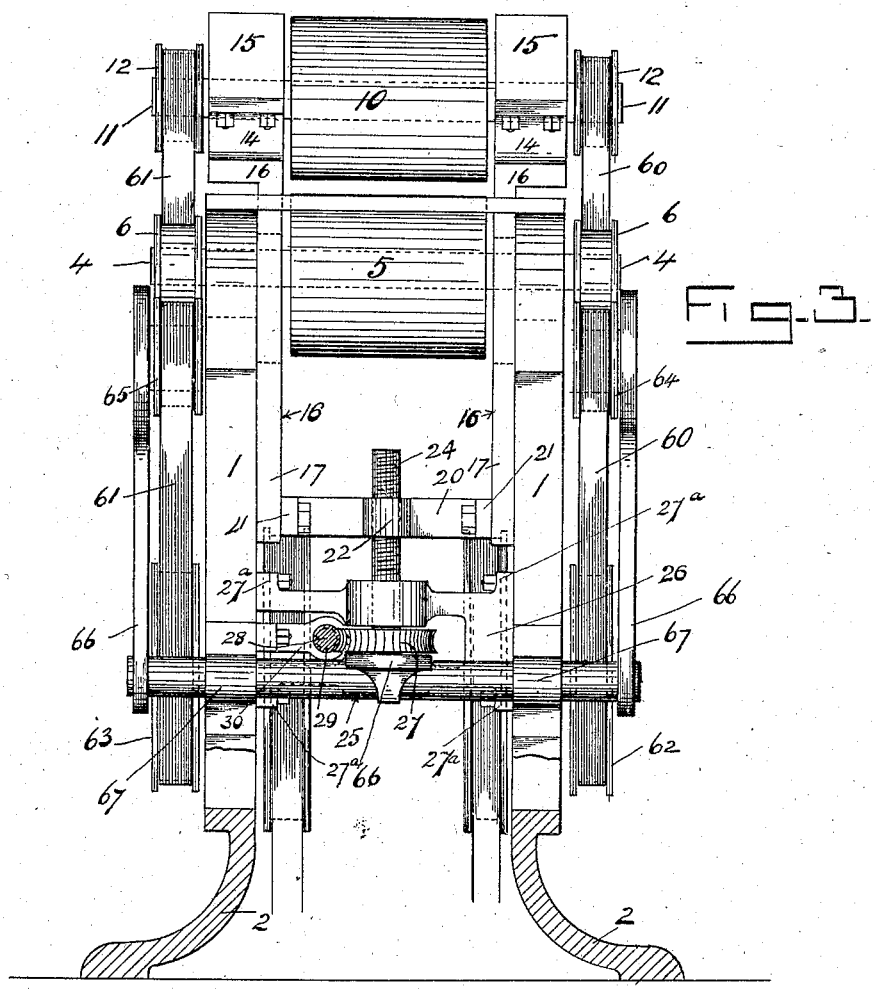
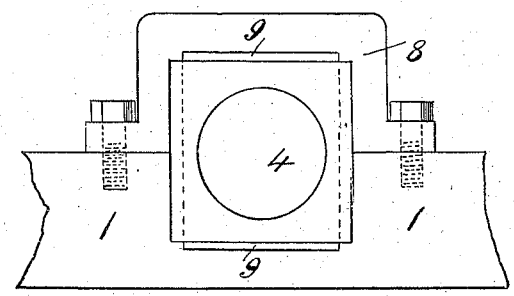
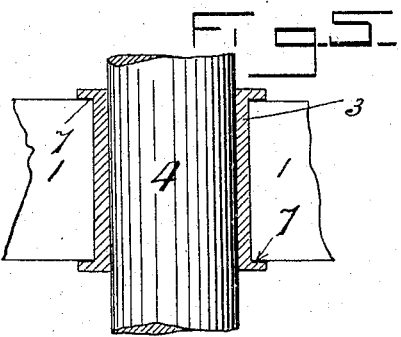
Witnesses
Vincent Hughes
Inventor
Robert Blair
By Alf. A. Thornton
his Attorney

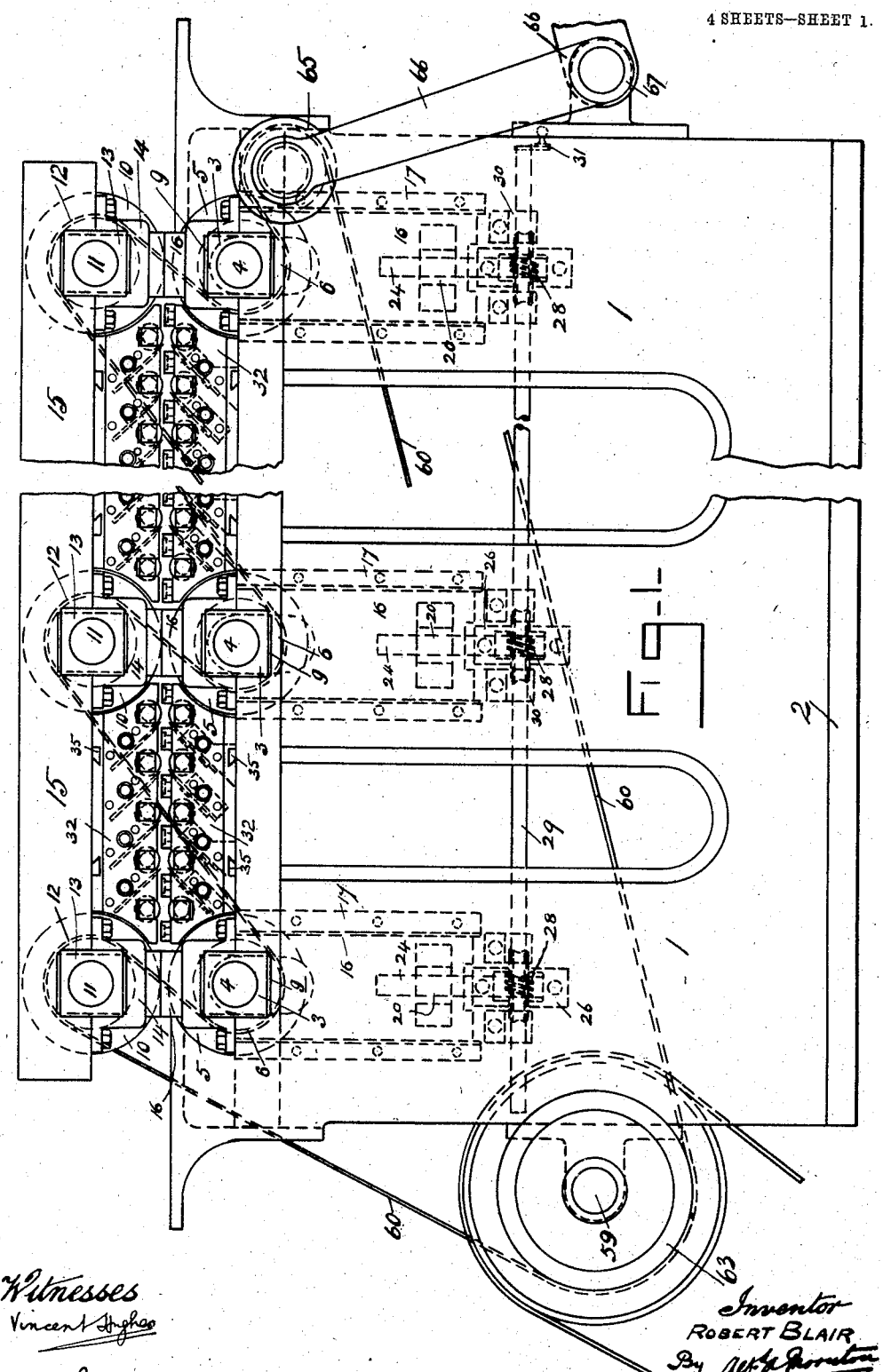

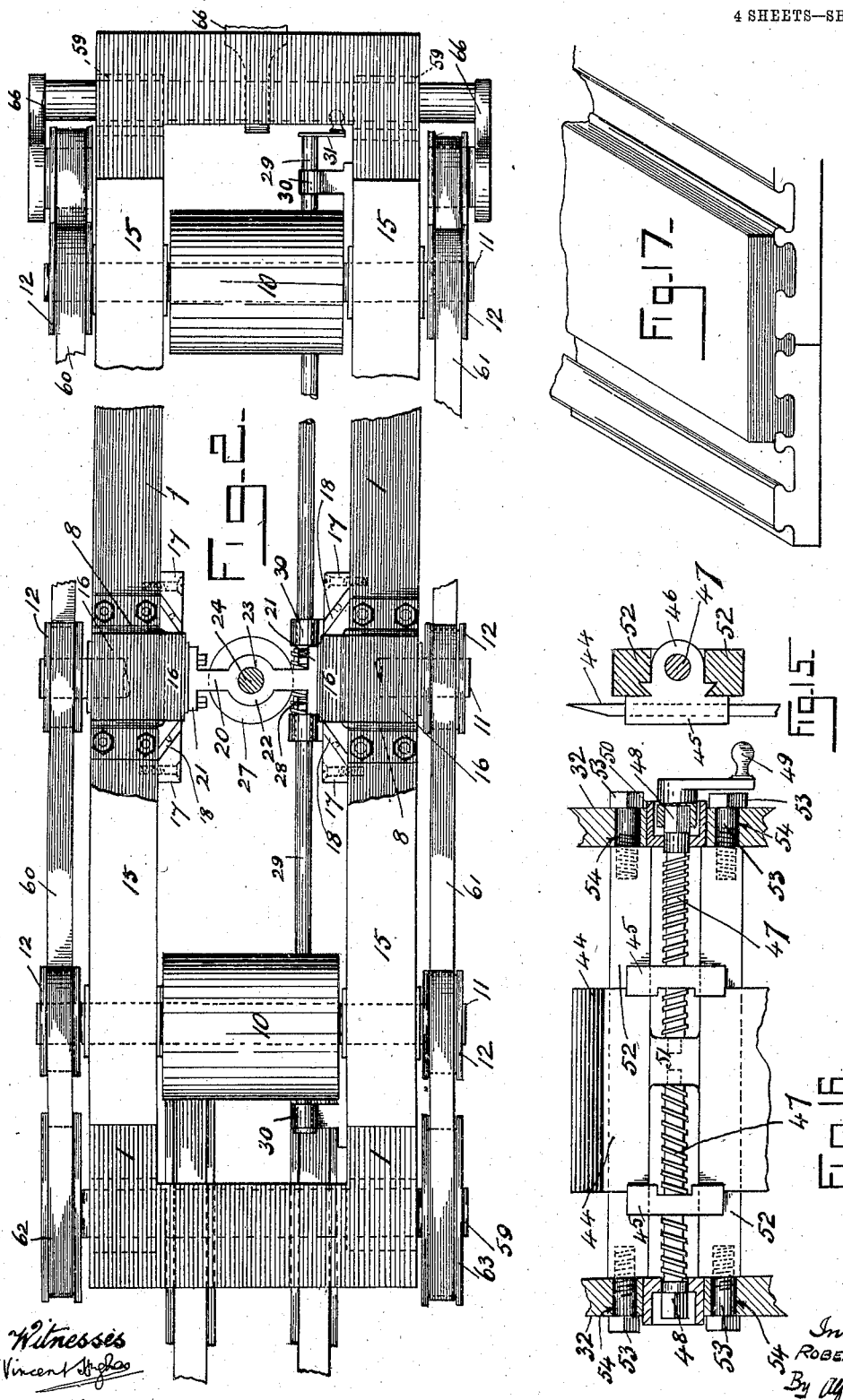

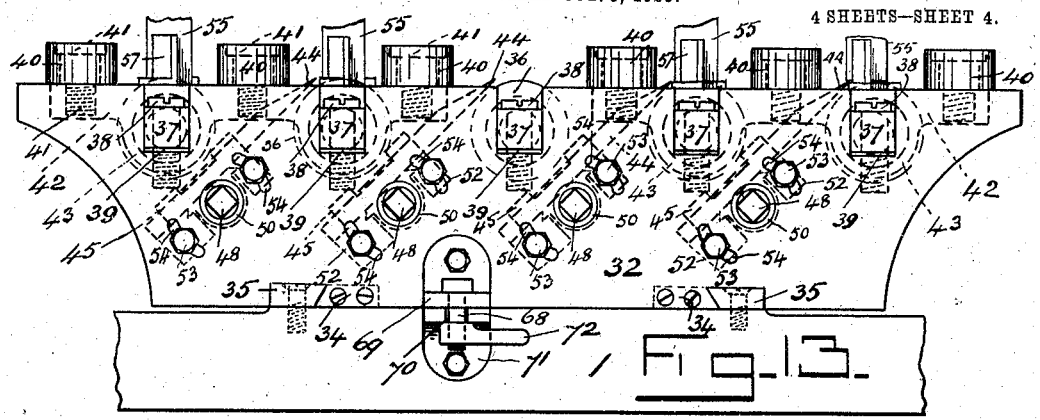

No. 791,604.

Patented June 6, 1905.

UNITED STATES PATENT OFFICE.

ROBERT BLAIR, OF SHEPHERD'S BUSH, ENGLAND.

WOODWORKING-MACHINE.

SPECIFICATION forming part of Letters Patent No. 791,604, dated June 6, 1905.

Application filed October 3, 1903. Serial No. 175,675.

*To all whom it may concern:*

Be it known that I, ROBERT BLAIR, a subject of the King of Great Britain, residing at Shepherd's Bush, in the county of Middlesex, England, have invented new and useful Improvements in Woodworking-Machines, of which the following is a specification.

This invention relates to improvements in woodworking-machines, and has for its objects to provide a machine wherein the wood to be operated upon is passed through the machine and during its passage is simultaneously planed on its top and bottom faces and both its edges in such a manner as to leave it at the finish with a perfectly smooth surface, either flat or molded or provided with tongues and grooves or other undulations, as may be desired.

A further object of my invention is to provide a machine which can be worked at a more rapid rate than other machines of this class and wherein the waste product will be in the form of wood-wool, which is of greater value than ordinary shavings.

In accordance with this invention I provide a machine the bed of which is composed of a number of vertically-adjustable friction-rollers mounted on spindles carried in bearings or supporting-blocks arranged in the vertical side members of a suitable framework. The side members of the framework of the machine carry driving-rollers of suitable diameter, which driving-rollers are mounted upon spindles supported in bearings in the side frames and extending a convenient distance beyond, their ends being provided with suitable driving-pulleys. The driving-rollers aforesaid are arranged at suitable intervals along the machine in two rows and in such a manner that each roller is in a vertical line with another roller, either immediately above or below it. Either or both of these rollers may be adjustable vertically, so that the space between them may be varied to suit different thicknesses of wood. These rollers are driven by means of two continuous belts passing around the driving-pulleys on each side of the machine and also around suitable guide-pulleys, the belts being driven from a suitable counter-shaft. One of the guide-pulleys on each side of the machine is mounted on the vertical arm of a bell-crank lever the horizontal arm of which can be depressed by the foot of the operator if it is desired to tighten the belts.

In between each set of driving-rollers two cutter-boxes are arranged, such cutter-boxes being removable to provide for the sharpening and adjustment of the cutters. Each cutter-box contains a number of cutters, and one box is arranged below the bed of the machine and the other in an inverted position above the bed, so that the set of cutters carried by the upper box operates upon the top surface of the work, while the cutters of the lower box operate upon the under surface of the work.

The friction-rollers, which, as aforesaid, practically form the bed of the machine, are preferably arranged before and after each cutter or set of cutters.

In order that my invention may be more readily understood and carried into practical effect, reference is hereby made to the accompanying sheet of illustrative drawings, wherein—

Figure 1 is a side elevational view of a machine constructed in accordance with my invention; Fig. 2, a plan view thereof, partly in section. Fig. 3 is an end elevational view. Figs. 4 and 5 are side elevational and sectional views, respectively, of the form of bearing-block used for supporting the driving-rollers. Figs. 6, 7, and 8 are front elevational, side elevational, and plan views, respectively, of the form of slides used for adjusting the upper driving-rollers. Figs. 9, 10, 11, and 12 are elevational and plan views of the guide-strips and fitting-strips, respectively, which I propose to use in conjunction with the slides aforesaid. Fig. 13 is a side elevational view of the cutter-boxes I employ in connection with my machine, Fig. 14 being a plan view thereof. Figs. 15 and 16 are sectional and plan views, respectively, of the mechanism I employ for adjusting transversely the horizontal cutters, while Fig. 17 is a perspective view of the jointed boarding and paneling which, among other things, I propose to manufacture with this machine.

Referring to the drawings, in which like figures of reference indicate corresponding parts wherever occurring throughout all the figures, the numeral 1 designates the side frames of the machine, which rise vertically from a bed-plate 2. Retained in recesses at intervals along the upper surfaces of the vertical side frames 1 of the machine, bearing or plumber blocks 3 are provided, in which bearing-blocks the spindles 4 of the lower driving-rollers 5 are held to revolve. The ends of these spindles 4 project out on both sides of the machine and carry driving-pulleys 6. The bearing-blocks 3, which are shown particularly in Figs. 4 and 5, are prevented from moving laterally by being provided with vertical grooves 7 and are prevented from moving vertically out of their retaining-recesses by caps 8, secured by studs to the side frames 1. In order to provide for the slight vertical adjustment of the lower driving-rollers 5, which may be necessary, sufficient vertical play is left for packing-strips 9 to be employed.

Immediately above each of the lower driving-rollers 5 upper depending driving-rollers 10 are provided, such rollers being mounted on spindles 11, having driving-pulleys 12 and carried in bearings 13 of precisely similar nature to the lower driving-rollers 5 and their accessories, as before described, a supporting-bracket 14, similar in construction to the cap 8 of the lower driving-rollers, being secured in an inverted position to the upper side frames 15. These upper side frames are vertically adjustable, being carried upon the upper ends of slides 16. These slides 16, which are illustrated in Figs. 6, 7, and 8, are slotted where the spindles 4 of the lower driving-roller 5 pass through them and are capable of sliding vertically in dovetail grooves formed by the angular faces of guide-strips 17, which guide-strips are bolted or otherwise secured to the side frames 1 of the machine. Fitting-strips 18 may be provided in connection with these guide-strips, pins or slight projections 19 being provided upon the angular face of the guide-strips to take into corresponding recesses in the fitting-strips 18 aforesaid for the purpose of obviating the tendency of the said fitting-strips to fall out of place owing to their vertical disposition. The slides 16 are arranged on the inner face of both of the side frames 1, such slides 16 each being arranged exactly opposite its corresponding slide and connected thereto by means of a bracket 20, provided with flanges 21, through holes in which flanges suitable securing-studs are passed. The brackets 20 are constructed with central bosses 22, which are each provided with a tapped opening 23, through which a screw-threaded rod 24 operates. The lower end of this rod 24 is supported in a journal 25, centrally situated in the lower arm of a bifurcated bracket 26, which bracket 26 is secured, by means of studs or bolts, to the side frames 1 of the machine, lugs or flanges $27^a$ being provided on the ends of the bracket 26 for this purpose. Keyed or otherwise fixed upon these screw-threaded rods 24 worm-wheels 27 are provided and arranged between the furcations of the bifurcated bracket 26. Operating in conjunction with these worm-wheels 27 a corresponding number of worms or screws 28 are provided, which worms or screws are formed or carried upon one shaft 29, which shaft is supported by bearing-brackets 30, secured upon the inner face of one of the side frames 1. It will be readily understood that if the shaft 29 is turned by means of the handle 31 all the worms or screws 28 will operate upon the worm-wheels 27, and the screw-threaded rods 24, operating in the tapped openings of the central bosses 22 of the bracket 20, will cause such brackets, and consequently the slides 16, attached thereto, to rise or fall, accordingly as the shaft 29 is turned one way or the other. The upper side frames 15 of the machine, which, as aforesaid, carry the upper depending driving-rollers 10, are secured to the tops of the slides by means of studs or bolts, the slides for this purpose having horizontal lugs at their upper ends.

Between each pair of driving-rollers I provide removable boxes 32 for carrying the knives or cutters 33 for operating upon the work. These cutter-boxes 32 are open at both top and bottom and are capable of sliding in and out of position transversely of the machine by means of slide-bars 34, secured to the sides of the cutter-boxes by means of screws and having their sliding faces cut at a suitable angle. These slide-bars 34 extend transversely across the bottom of the cutter-box and operate in conjunction with correspondingly-cut guide-bars 35, rigidly secured, by means of studs or their equivalent, to the upper surfaces of the side frames 1 of the machine, the said guide-bars 35 extending transversely across the machine from side to side.

Between each pair of driving-rollers the cutter-box 32 is arranged and supported upon the side frames 1 of the machine and its cutters in position for operating upon the lower surface of the work, and a second cutter-box is carried in an inverted position by the upper framework, its cutters being so arranged as to operate upon the upper surface of the work. In order to provide for the easy passage of the work through the machine, a number of friction-rollers 36 are provided in connection with the cutter-boxes. These friction-rollers 36 are each preferably divided into three portions and are loosely mounted upon rigid spindles 37, the ends of which are of square section and fit into square recesses cut in those surfaces of the side frames of the cutter-boxes which are nearest the work. These spindles are held in position by means of screws or studs 38, which pass through holes in the square ends of the spindles and screw into the sides of the cutter-boxes. Vertical adjustment of these rollers is effected by means of packing-strips 39. Vertical rollers 40 are also provided to operate against the edges of the work. These vertical rollers 40 are mounted on headed pins 41, the lower ends of which pins are screw-threaded and take into tapped openings in a platform or bracket 42, supported by the spindles 37, the said spindles passing through holes in lugs 43 of the brackets 42, which brackets occupy the space between the ends of the friction-rollers 36 and the inner faces of the sides of the cutter-boxes 32.

The knives or cutters 44 are so arranged as to enable them to be adjusted laterally and also to enable the angles at which they operate to be changed within certain limits, as will hereinafter appear. Each of the said knives or cutters 44 is held between two sliding jaws 45, each of which is carried upon a boss 46, provided with a tapped opening through which a screw-threaded rod or spindle 47 operates. This screw-threaded rod 47 has a squared end 48 to accommodate a removable turning key or handle 49. The screw-threaded rod is held to revolve in a bearing-collar 50, mounted in the side of the cutter-box 32 at the one end, and the other end is reduced somewhat and is journaled in a block 51, which block 51 connects together the guide-bars 52, along which the bosses 46 of the sliding jaws 45 travel. These guide-bars 52 are held rigid by means of studs or screws 53, which pass through slots 54 in the sides of the cutter-box 32 into tapped openings in the ends of the guide-bars 52.

It will be understood that each of the sliding jaws holding a cutter being mounted on an independent screw, the position of the cutter can be altered laterally and removed for sharpening purposes by the operations of the screws 47 in the tapped openings in the bosses 46 of the sliding jaws 45, while the angle at which the cutter operates can be altered, the slots 54 permitting the position of the guide-bars 52 being altered for this purpose. The exact adjustment of the cutter to the work is effected by means of a hammer after the manner of adjusting an ordinary plane-iron. A cutter is preferably arranged between each of the friction-rollers.

For operating upon the edges of the work vertically-disposed cutters 55 are employed, being held between holders 56, consisting of vertical angle-irons 57, set in such a position as to hold the cutter at a correct angle for operating upon the work, the cutters 55 being held in position by set-screws 58. These vertical cutters are preferably each arranged between the vertical friction-rollers 40.

The machine is driven from a counter-shaft 59, mounted in bearings carried by the framework of the machine, by means of two driving-belts 60 and 61, which pass around driving-pulleys 62 and 63, carried by the counter-shaft, and thence around the pulleys 6, carried by the spindles 4 of the driving-rollers 5. The belts 60 and 61 also pass over tension-pulleys 65 and 65, mounted upon the ends of a bracket carried upon the upper end of a bell-crank lever 66, the fulcrum of which is supported in bearings 67, arranged in such a position at the front of the machine that the forward extremity of the horizontal arm of the said bell-crank lever will be in a convenient position for depression by the operator's foot when it is necessary or desirable to tighten the belts.

The cutters or knives 44 and 55 are so adjusted that each cutter has very little work to perform—that is to say, that each cutter is adjusted slightly nearer to the work than the preceding one—and while the first set of cutters may conveniently be utilized for giving the work smooth surfaces the succeeding cutters may be so shaped and situated as to groove or mold the work.

As an example of the operation of the machine I propose to utilize it for the manufacture of the jointed boarding shown in Fig. 17, which consists mainly in cutting or grooving planks to produce a series of dovetail tongues and grooves, the angles of the dovetails being rounded off, so that a perfect joint may be effected. Every alternate tool or cutter in this operation may conveniently have a serrated cutting edge and the remainder an ordinary plane edge. The plank is fed into the machine from the front and is drawn through by the driving-rollers 5, guided and assisted by the friction-rollers 36 and 40, before described. As the plank passes the stationary cutters 44 and 55 it is operated upon by the said cutters.

The first cutter or sets of cutters, which, as aforesaid, are used for giving the board a smooth surface, extend, preferably, entirely across the machine, so as to operate upon the whole surface of the work. The next cutter may be divided at the center and commence to cut the grooves in the surface, and each succeeding cutter will cut a little deeper and be shaped so as to cut the grooves in the correct form. It will be readily understood that the plank will emerge from the rear of the machine with the tongues and grooves correctly cut.

The utilization of a number of tools each adjusted to perform a small amount of work will enable the machine to be worked at a rapid rate, and the waste substance will be in the form of wood-wool, a more valuable commodity than ordinary shavings.

The cutter-boxes 32 may, if it is found desirable, be locked in position by means of a headed bolt 68, carried by a horizontal bracket 69, attached upon the side of the cutter-box 32. The lower end of this bolt 68 lies when the cutter-box is in position in a slot 70 in a horizontal lug of a bracket 71, attached to the side frames 1 of the machine. This lower end of the said bolt 68 is screw-threaded, and a nut or tapped handle 72 is provided, so that a turn will secure the cutter-box firmly in position. It is obvious that if it is desired to slide the cutter-box out the slacking of the nut or handle 72 will permit of the box being drawn out, the bolt 68 and its accessories being carried with the said cutter-box.

What I claim as my invention, and desire to secure by Letters Patent, is—

1. In woodworking-machines, the combination with permanently-fixed vertical lower side frames; of vertically-adjustable upper side frames; of recesses in the horizontal edges of said side frames; of bearings capable of limited vertical adjustment disposed within said recesses; of vertical retaining-grooves in said bearings; of retaining-caps for said bearings; of driven spindles mounted in said bearings; of driving-belt pulleys rigidly mounted on the ends of said spindles, and of driving-rollers centrally mounted on said spindles, substantially as specified.

2. In woodworking-machines of the class described, the means for vertically adjusting the upper side frames carrying the upper driving-rollers, said means comprising the combination with a rotatable shaft mounted in bearing-brackets; of worms on said shaft; of worm-wheels gearing with said worms; of screw-threaded spindles carrying said worm-wheels; of bifurcated brackets supporting said screw-threaded spindles; of slotted vertical slides upon which the upper side frames are mounted operating in guides attached upon the inner faces of the lower side frames; of brackets connecting the slides upon one side of the machine with the slides upon the other and of the tapped bosses centrally of the said brackets, substantially as specified.

3. In woodworking-machines of the class described, the removable cutter-boxes consisting of open boxes having side frames forming extensions of the side frames of the machine, said cutter-boxes being arranged in pairs between the driving-rollers, the one supported in an upright by the side frames of the machine and the other carried in an inverted position by the vertically-adjustable framing, said cutter-boxes carrying vertically-adjustable spindles in recesses in their edges nearest the work, upon which spindles divided friction-rollers are held to revolve, said spindles also supporting brackets arranged on either side of the horizontal friction-rollers, which brackets carry vertical friction-rollers and adjustable tools for operating upon the edges of the work, said cutter-boxes also carrying adjustable horizontal tools for operating upon the upper and lower surfaces of the work, substantially as specified.

4. In woodworking-machines of the class described, the combination with a removable cutter-box framing open at both top and bottom; of slide-bars held to the side frames and extending transversely across the bottom of the said framing; of corresponding parallel guide-bars held upon the upper edges of the side frames of the machine; of recesses cut in the upper longitudinal edges of the removable cutter-box framing; of square-ended spindles rigidly held in said recesses; of divided friction-rollers held to revolve upon said spindles; of brackets supported by said spindles, said brackets being arranged between the ends of the friction-rollers and the inner faces of the side frames of the cutter-box; of vertical friction-rollers carried by said brackets; of the headed pins upon which said vertical friction-rollers revolve; of angle-iron vertical tool-supporting uprights; and of tool-securing set-screws, substantially as specified.

5. In woodworking-machines of the class described, the means for carrying and adjusting the horizontal cutters, said means comprising the combination with the side frames of the cutter-box of guide-bars connected together by a central boss; of securing-studs; of slots in the side frames of the cutter-box; of tapped openings in the ends of the guide-bars; of sliding tool-holding jaws; of square-ended adjusting-screws journaled in the central guide-bar boss and in the side frames of the cutter-box; of the tapped openings in the bosses of the tool-holding jaws through which the adjusting-screws operate, substantially as specified.

6. The improvements in woodworking-machines consisting in the combination of the vertical lower side frames; the vertically-adjustable upper frames; the means for adjusting the said upper frames; the driving-rollers carried by said frames; removable cutter-boxes carried and supported by said frames; means for holding said cutter-boxes securely in position, and the means for tightening the driving-belts at will, all arranged, combined and operating substantially as hereinbefore specified.

In testimony whereof I have signed my name to the specification in the presence of two subscribing witnesses.

ROBERT BLAIR.

Witnesses:
 ALFD. A. THORNTON,
 H. A. WOODBRIDGE.